United States Patent [19]
Yokogawa et al.

[11] Patent Number: 5,440,532
[45] Date of Patent: Aug. 8, 1995

[54] DIGITAL SIGNAL REPRODUCING APPARATUS FOR REPRODUCING DIGITAL SIGNALS FROM A RECORDING MEDIUM

[75] Inventors: Fumihiko Yokogawa; Hideki Hayashi, both of Tsurugashima, Japan

[73] Assignee: Pioneer Electronic Corporation, Tokyo, Japan

[21] Appl. No.: 230,817

[22] Filed: Apr. 21, 1994

[30] Foreign Application Priority Data

Apr. 27, 1993 [JP] Japan ................................. 5-101070

[51] Int. Cl.$^6$ ............................................. G11B 17/22
[52] U.S. Cl. ..................................... 369/32; 369/54; 369/59; 369/48
[58] Field of Search ................. 369/32, 54, 44.25, 48, 369/47, 58, 59, 33, 52, 53, 124, 275.3, 44.28; 360/55, 39–40, 32, 53, 51, 48

[56] References Cited
U.S. PATENT DOCUMENTS 5,115,422  5/1992  Ishikawa et al. ...................... 369/54

Primary Examiner—Ali Neyzari
Attorney, Agent, or Firm—Foley & Lardner

[57] ABSTRACT

A digital signal reproducing apparatus is capable of reproducing digital signals with an accurate sampling clock synchronized with the phase of a read signal. A sequence of predetermined sampled values are detected from sampled values produced by A/D converting a read signal. In this sequence of predetermined sampled values, a difference value of two samples produced at timings spaced apart by a predetermined interval from each other is calculated in order to generate a sampling clock having the phase corrected on the basis of the difference value.

2 Claims, 11 Drawing Sheets

FIG.11A (p)
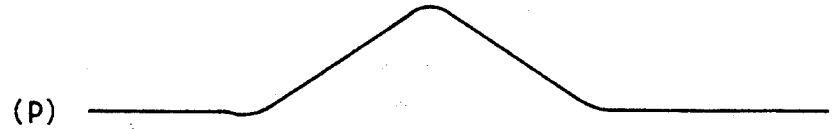
FIG.11B (sb)
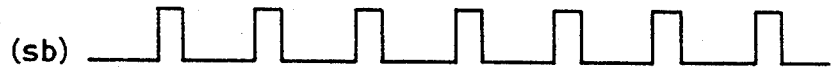
FIG.11C (g)
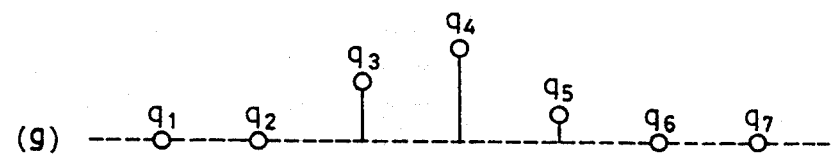
FIG.11D (sa)
FIG.11E (t)
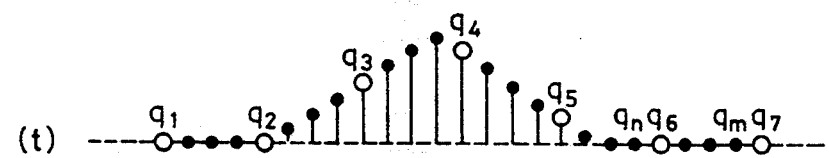
FIG.11F (k)
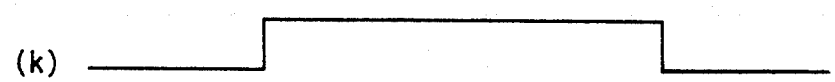
FIG.11G (m)
FIG.11H (r)
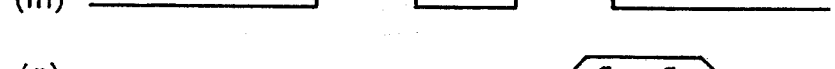
FIG.11I (sc)
FIG.11J (u)
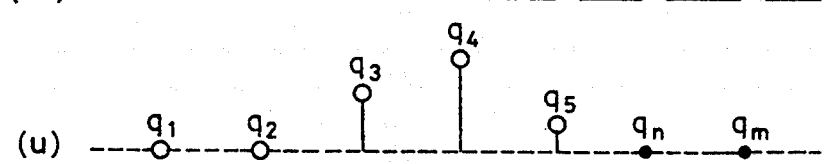

FIG.12A (Sa) 
FIG.12B (Sb) 
FIG.12C (Sc1) 
FIG.12D (Sc2) 
FIG.12E (Sc3) 
FIG.12F (Sc4) 

READ SIGNAL

SAMPLING CLOCK

SAMPLE VALUES

TIMING SIGNAL (m)

CALCULATED DIFFERENCE VALUE (r)

$\{(q_1 + q_2 + q_3) - (q_5 + q_6 + q_7)\}$

DIGITAL SIGNAL REPRODUCING APPARATUS FOR REPRODUCING DIGITAL SIGNALS FROM A RECORDING MEDIUM

BACKGROUND OF THE INVENTION

1. Field of the Invention

The present invention relates to a digital signal reproducing apparatus for reproducing digital signals from signals read from a recording medium on which the digital signals are recorded, and more particularly, to a digital signal reproducing apparatus in accordance with a sampled servo system.

2. Description of Background Information

On an optical disk called a DRAW (Direct Read After Write) disk, servo bytes are recorded as shown in FIG. 1.

Each sector on an optical disk comprises 43 servo blocks, each of which is composed of two servo bytes followed by 16 data bytes. A servo byte consists of two wobbled pits Wp1, Wp2 and a clock pit Cp, wherein the wobbled pits Wp1, Wp2 are located on the left and right sides of the track center, respectively.

As an information detecting point of an pickup (a light spot for detecting information) is moving on the track center, decreased light amounts are equal at the locations of the left and right wobbled pits Wp1, Wp2. However, if the light spot deviates to the left or right from the track center, the decreased light amounts at the locations of the two wobbled pits Wp1, Wp2 change corresponding to the direction and amount of the deviation of the light spot. Thus, a tracking error signal may be generated from the difference between the decreased light amounts at the two positions (difference in level between RF signals). This tracking error signal is held for a subsequent data byte block.

The distance D between the wobbled pit Wp2 and the clock pit Cp is set longer than a maximum distance between two adjacent pits in a data byte. This distance D may therefore be detected as a synchronizing signal. A variety of timing signals are generated on the basis of the detected synchronizing signal. Also, a clock is generated corresponding to a signal indicating that the clock pit CP has been detected.

A mirror portion in the distance D is used as a focus area in which a focus error signal is detected and held for a subsequent data byte block.

When a DRAW disk of, for example, five inches, on which servo bytes as described above have been recorded thereon, is rotated at 1800 rpm, edges generated in the RF signal by the presence of clock pits have a repeating frequency of 41.28 KHz.

There is known a digital signal reproducing apparatus which reads address data and so on recorded subsequent to the servo bytes on a DRAW disk as mentioned above, and utilizes the read data to reproduce digital signals recorded on data information sections of the DRAW disk.

Such reproduction should be performed in consideration of a delay time of the apparatus. However, it is rather difficult to set the delay time since delays caused by a differential circuit and an edge detecting circuit of the reproduction apparatus must be taken into account for deriving an accurate delay time. Further, if changes in temperature, power supply voltage and so on result in fluctuating the delay amount, a clock for reproduction cannot be generated with a high accuracy.

SUMMARY OF THE INVENTION

The present invention has been made to solve the problems mentioned above, and it is an object of the present invention to provide a digital signal reproducing apparatus which is capable of reproducing digital signals with an accurate sampling clock in synchronism with the phase of read signals.

According to a first aspect of the present invention, there is provided a digital signal reproducing apparatus which samples a read signal taken from a recording medium having digital signals recorded thereon to produce sampled values of a digital signal, which comprises an A/D convertor for sampling the read signal at timings of pulses of a sampling clock signal to sequentially produce sampled values, a detector for detecting a sequence of predetermined sampled values in the sampled values, a difference calculator for calculating a difference between two sampled values, selected from the sequence of predetermined sampled values, to derive a difference value, the two sampled values being produced at timings spaced apart by a predetermined interval, and a clock generator for generating the sampling clock which has the phase corrected on the basis of the difference value.

According to a second aspect of the present invention there is provided a digital signal reproducing apparatus which samples a read signal taken from a recording medium having digital signals recorded thereon to produce sampled values of a digital signal, which comprises an A/D convertor for sampling the read signal at timings of pulses of a first sampling clock signal to sequentially produce sampled values, a detector for detecting a sequence of predetermined sampled values in the sampled values; difference calculating means for calculating a difference between two sampled values selected from the sequence of predetermined sampled values to derive a difference value, the two sampled values being produced at timings spaced apart by a predetermined interval, an interpolator for performing interpolation operations on the sampled values to produce interpolated sampled values, a clock generator for generating a second sampling clock signal, the phase of which is corrected on the basis of the difference value, the second sampling clock signal having the same frequency as the first sampling clock signal, and a sampling circuit for fetching the interpolated sampled values at timings of pulses of the second sampling clock signal and outputting the interpolated sampled values.

By the above-described structures, a sequence of predetermined sampled values are detected from sampled values produced by A/D converting a read signal, and a difference value between two samples, within these predetermined sampled values, produced at timings spaced apart by a predetermined interval from each other is calculated, and a phase corrected sampling clock is generated on the basis of this difference value.

BRIEF DESCRIPTION OF THE DRAWINGS

FIGS. 11A to 11J are timing charts for explaining the operation of the digital signal reproducing apparatus of FIG. 10;

FIGS. 12A to 12F are diagrams for explaining the operation of a phase selecting circuit 23.

DESCRIPTION OF THE PREFERRED EMBODIMENTS

Prior to describing embodiments of the present invention, a conventional digital signal reproducing apparatus will be explained in connection with its configuration and operation with reference to FIGS. 2 and 3A to 3G.

Figure 1:
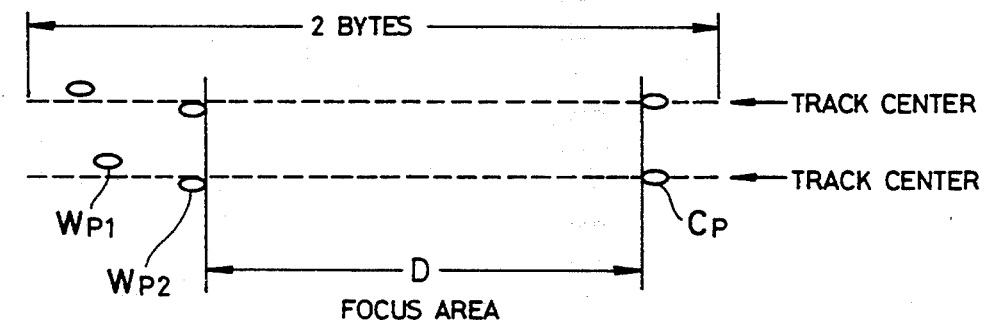
FIG. 1 schematically shows a servo byte pattern.
Figure 2:
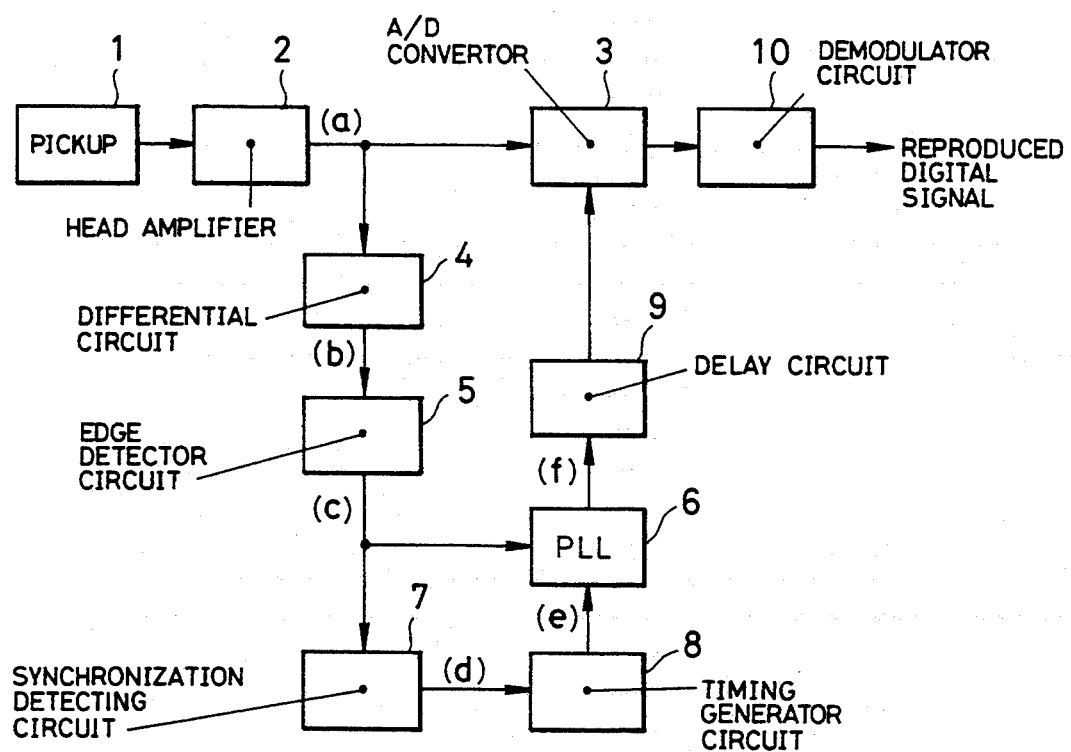
FIG. 2 is a block diagram showing the configuration of a conventional digital signal reproducing apparatus.

FIG. 2 shows the configuration of such a conventional digital signal reproducing apparatus, and FIGS. 3A to 3G show an example of a timing chart for the operation performed by the configuration of FIG. 2.

In FIG. 2, a pickup 1 reads a recorded signal on a disk (not shown) and supplies a head amplifier 2 with a read signal corresponding to the recorded signal. The head amplifier 2 amplifies the read signal supplied thereto and supplies an amplified read signal (a) to an A/D convertor 3 and a differential circuit 4, respectively. The differential circuit 4 differentiates the read signal (a) and supplies an edge detecting circuit 5 with a differentiated signal (b) thus generated. The edge detecting circuit 5 slices the differentiated signal (b) at a center level to generate a pulse signal as an edge signal (c) which is then supplied to a PLL (Phase Locked Loop) circuit 6 and a synchronization detecting circuit 7, respectively. The synchronization detecting circuit 7 measures respective intervals between adjacent two pulses in the edge signal (c), and generates a synchronization signal (d) indicative of the existence of synchronization information in the read signal when the interval becomes equal to a predetermined time Dt, and supplies this synchronization signal (d) to a timing generator circuit 8. The timing generator circuit 8 periodically generates a timing signal (e) having a predetermined width based on the synchronization signal (d) and supplies this timing signal (e) to the PLL circuit 6. The PLL circuit 6 generates a clock for reproduction (f) at a predetermined frequency which is synchronized with a falling edge of the edge signal (c) when the timing signal (e) is at a high level, and supplies this clock for reproduction (f) to a delay circuit 9. The delay circuit 9 delays the clock for reproduction (f) by a predetermined time in order for the A/D convertor 3 to optimally read data, and supplies this delayed clock to the A/D convertor 3 as a sampling clock. The A/D convertor 3 converts the read signal (a) amplified by the head amplifier 2 to a digital signal at a timing of the supplied sampling clock, and supplies this digital signal to a demodulator circuit 10. The demodulator circuit 10 demodulates the digital signal which was modulated when recorded on a disk, and outputs the demodulated digital signal as a reproduced digital signal.

As described above, the distance between the wobbled pit Wp2 and the clock pit Cp is set longer than a maximum length between pits in a data byte. Therefore, the interval between adjacent pulses in the edge signal (c) is measured, and when this interval is detected to be equal to an interval Dt between a pulse Ep generated in accordance with the wobbled pit Wp2 and a pulse Ec generated in accordance with the clock pit Cp, the synchronization signal (d) is generated to indicate that synchronization information exists. Then, the pulse Ec in accordance with the clock pit Cp can be extracted from the edge signal (c) by using the timing signal (e) which is generated on the basis of this synchronization signal (d). At the timing of the falling edge of the pulse Ec, the phase of the reproduced clock (f) is corrected.

Figure 3:
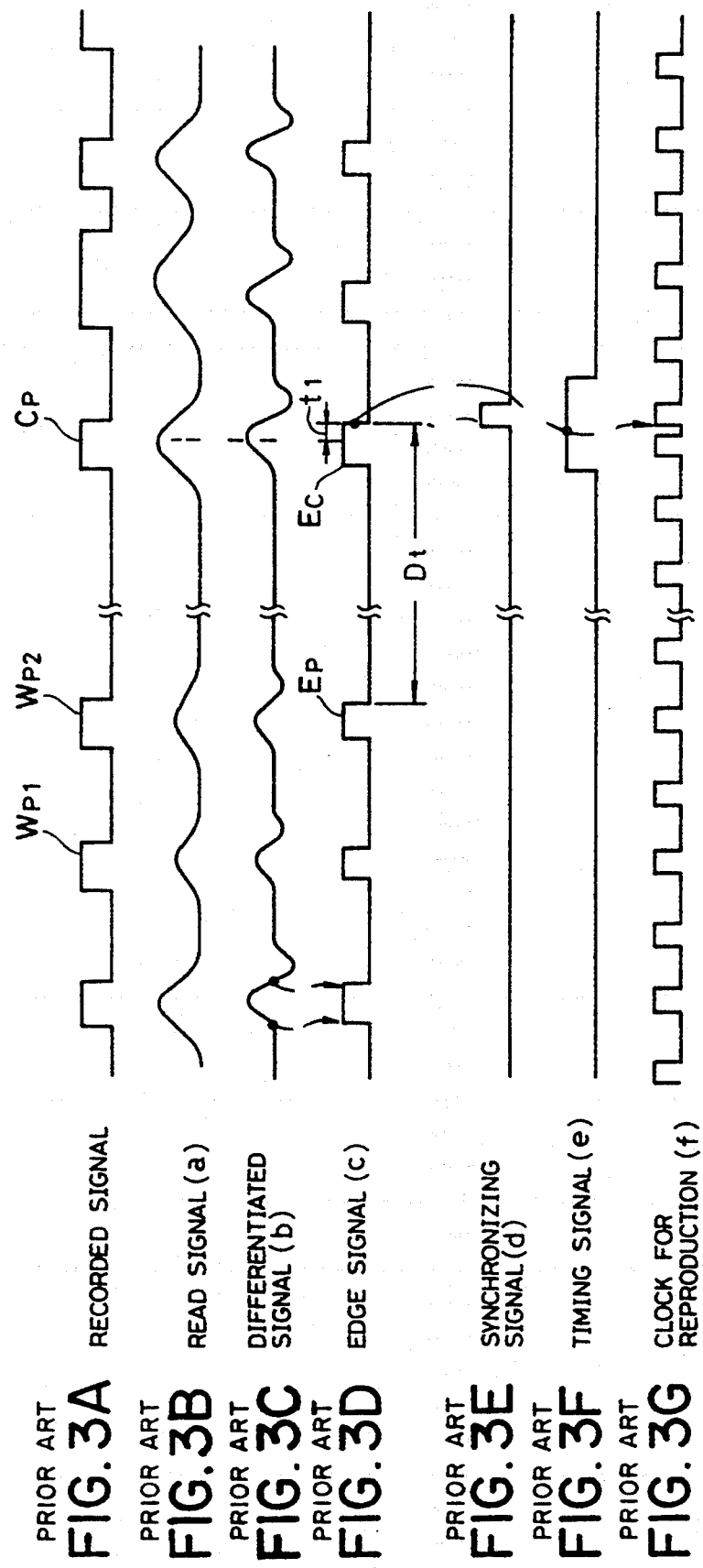
FIGS. 3A to 3G are timing charts for explaining the operation of the conventional digital signal reproducing apparatus of FIG. 2.

A delay time provided by the delay circuit 9 in the above described configuration compensates for the falling edge timing of the pulse Ec in FIG. 3 which was shifted by t1 with respect to a peak of the read signal (a) due to circuit delays of the differential circuit 4 and the edge detecting circuit 5.

However, as mentioned before, since the delay time of the delay circuit 9 must be determined in consideration of the circuit delays of the differential circuit 4 and the edge detecting circuit 5, it is rather onerous to set the delay time. Further, the conventional digital signal reproducing apparatus has a problem that the clock of reproduction cannot be accurately generated if the delay amount fluctuates due to changes in temperature, supplied voltage, and so on.

Now, embodiments of the present invention will be described below.

Figure 4:
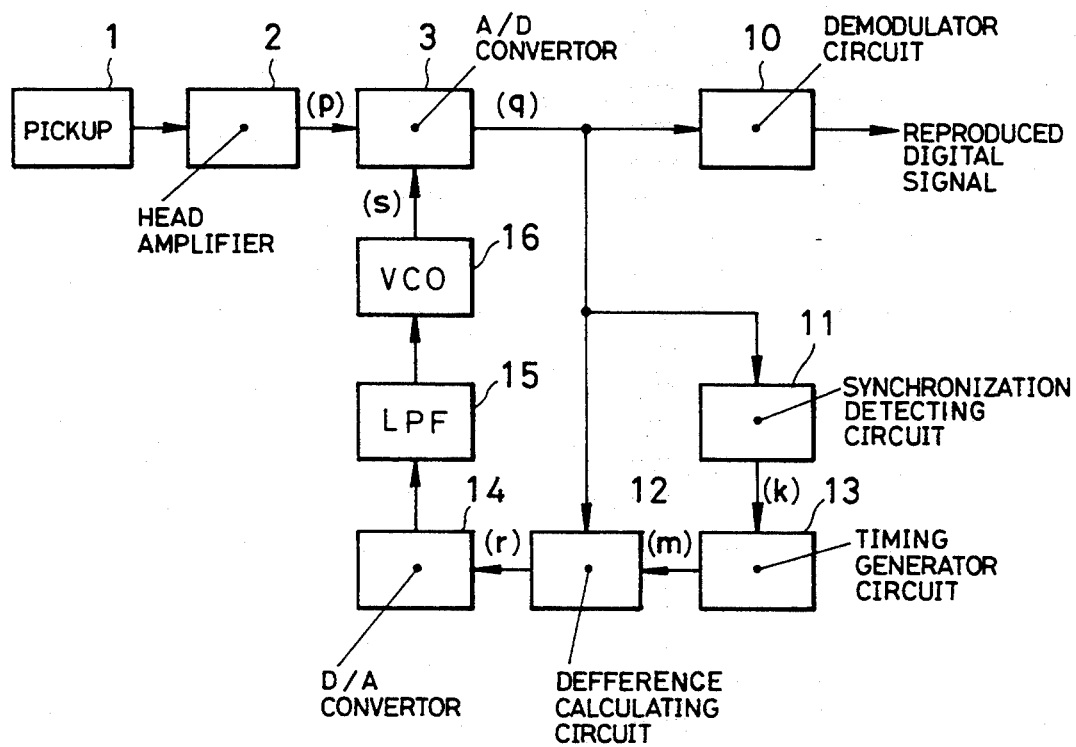
FIG. 4 is a block diagram showing the configuration of a digital signal reproducing apparatus according to the present invention.
Figure 5:
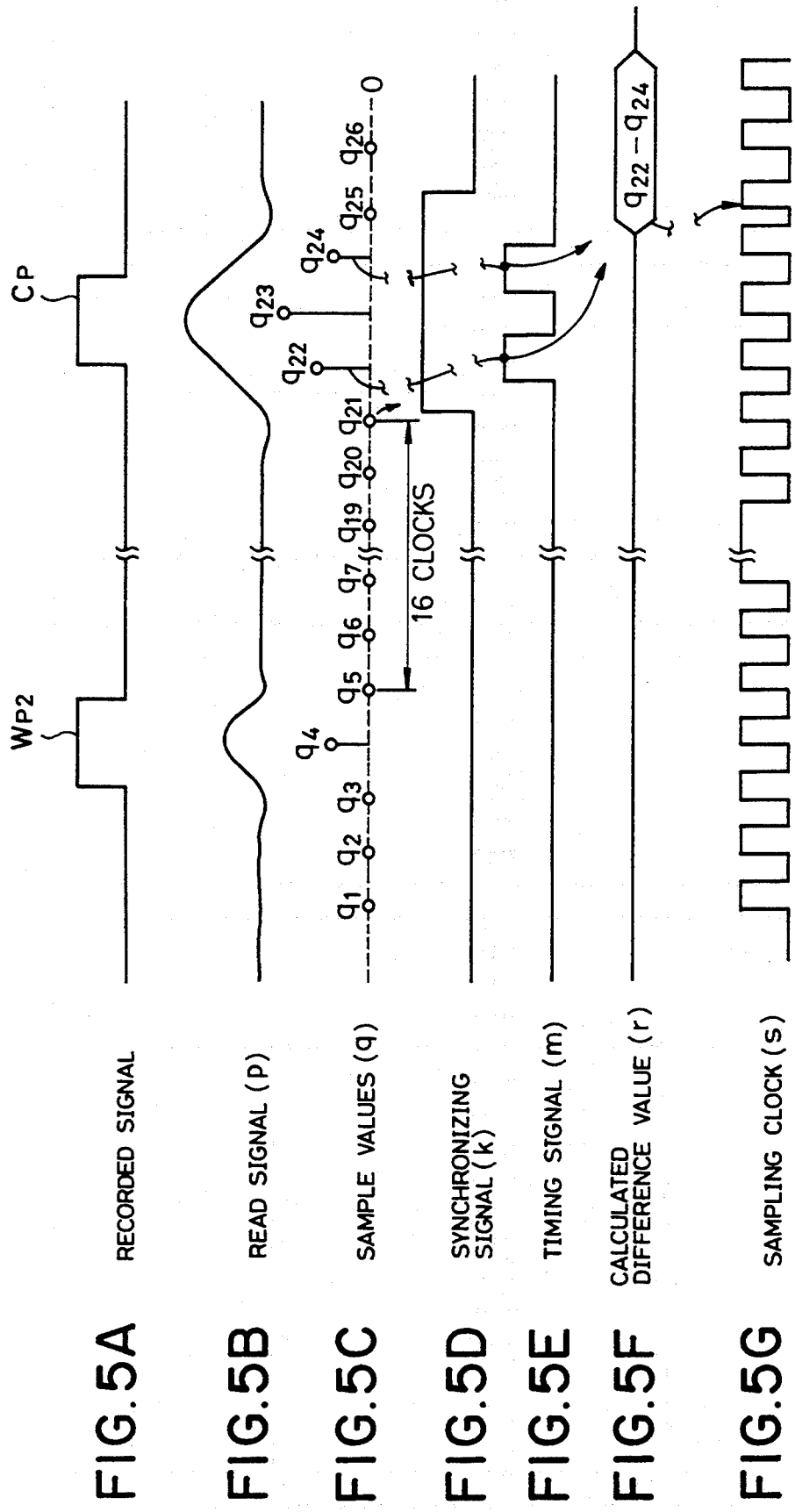
FIGS. 5A to 5G are timing charts for explaining the operation of the digital signal reproducing apparatus of FIG. 4.

FIG. 4 shows the configuration of a digital signal reproducing apparatus according to a first invention of the present application.

In FIG. 4, a pickup 1 reads a signal recorded on a disk (not shown) and supplies a read signal in accordance therewith to a head amplifier 2. The head amplifier 2 amplifies the read signal supplied thereto, and supplies an A/D convertor 3 with the amplified signal as a read signal (p). The A/D convertor 3 converts the read signal (p) to sampled values (q) of a digital signal at the timings of sampling clock pulses, and supplies the sampled values (q) to a demodulator circuit 10, a synchronization detecting circuit 11, and a difference calculating circuit 12, respectively. The demodulator circuit 10 demodulates the sampled values (q), for the demodulation of the digital signal which was modulated when recorded on a disk, and outputs this demodulated digital signal as a reproduced digital signal. The synchronization detecting circuit 11 observes the sampled values (q) and generates a synchronization signal (k) having a predetermined width when the sampled values maintain a predetermined level for a predetermined time, and supplies this synchronization signal (k) to the timing generator circuit 13. The timing generator circuit 13 generates a timing signal (m) including two consecutive pulses having a predetermined pulse width and spaced by a predetermined interval in response to the synchronization signal (k), and supplies this timing signal to the difference calculating circuit 12. The difference calculating circuit 12 takes the difference between two sampled values (q) produced when the two pulses of the timing signal (m) are at a high level, and supplies the difference to a D/A convertor 14 as a calculated difference value (r). The D/A convertor 14 converts the calculated difference value (r) supplied thereto to an analog voltage which is then supplied to an LPF (Low Pass Filter) 15. The LPF 15 averages the supplied analog voltage which is supplied to a VCO (Voltage Controlled Oscillator) 16. The VCO 16 generates a clock signal having an oscillating frequency in accordance with the average analog voltage supplied from the LPF 15, and supplies the A/D convertor 3 with this clock signal as a sampling clock (s).

Next, the operation of the digital signal reproducing apparatus configured as described above will be explained.

FIGS. 5A to 5G show an operation timing chart representing the operation performed by the digital signal reproducing apparatus of this embodiment.

In FIGS. 5A to 5G a sampled value {q4} is produced in accordance with a reproduced wobbled pit Wp2, and sampled values {q22, q23, q24} in accordance with a reproduced clock pit Cp. In this event, since no pit exists between the wobbled pit Wp2 and the clock pit Cp, all sampled values q5–q21 in the chart indicate a zero value.

As described above, the distance between the wobbled pit Wp2 and the clock pit Cp is set at a special value which is different from the interval between pits in a data byte. Therefore, it can be said that a time period equal to 16 sampling clocks from the sampled value q5 to the sampled value q21 is also a special length. It will be understood that a sampled value in accordance with the clock pit Cp necessarily exists after 16 sampled values at zero level appear consecutively.

The synchronization detecting circuit 11 generates the synchronization signal (k) for indicating the existence of the sampled values {q22, q23, q24} produced in accordance with the clock pit Cp when it detects 16 consecutive sampled values (q) at zero level. The timing generator circuit 13, in response to the synchronization signal (k), generates the timing signal (m) as illustrated, in order to select the sampled values q22, q24 appearing before and after the sampled value 23 which is a peak value. The difference calculating circuit 12 subtracts the sampled value q24 from the sampled value q22, both selected by the timing signal (m), and outputs the subtraction result as a calculated difference value (r). Thus, a circuit configuration composed of the D/A convertor 14, LPF 15 and VCO 16 converts the supplied calculated difference value (r) to an analog voltage, averages this analog voltages and generates a clock signal having an oscillating frequency in accordance with the averaged analog voltage thus calculated as the sampling clock (s).

In the above configuration, an amount of phase error of the sampling clock (s) with respect to the read signal (p) is calculated by use of the calculated difference value (r), and the phase of the sampling clock (s) is corrected by an average value of the calculated difference value (r).

Figure 6:
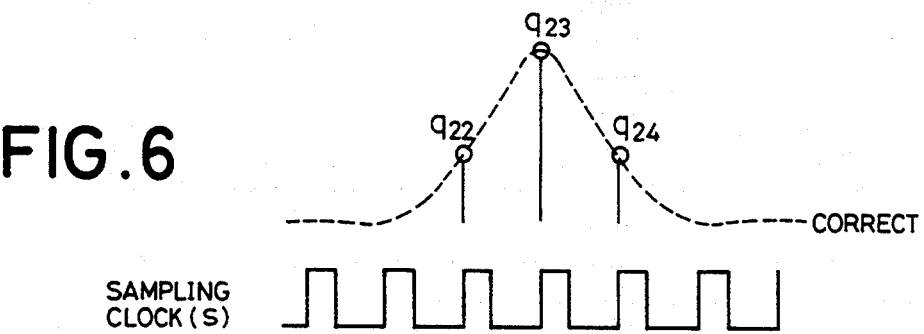
FIGS. 6 through 8 are diagrams for explaining a phase correcting operation performed by the digital signal reproducing apparatus of the present invention.
Figure 7:
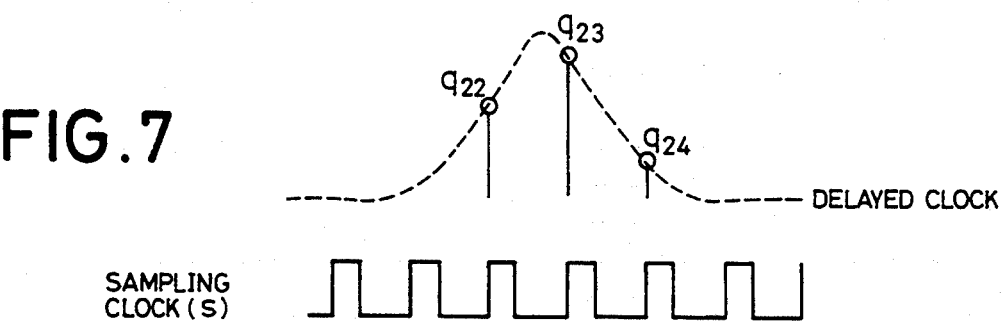
Figure 8:
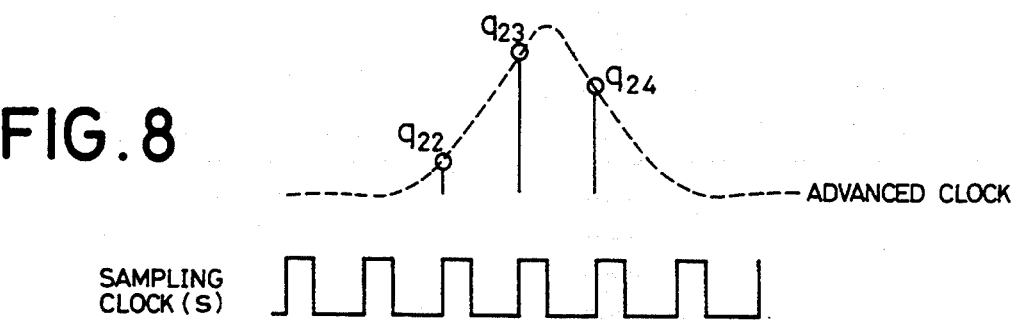
Figure 9:
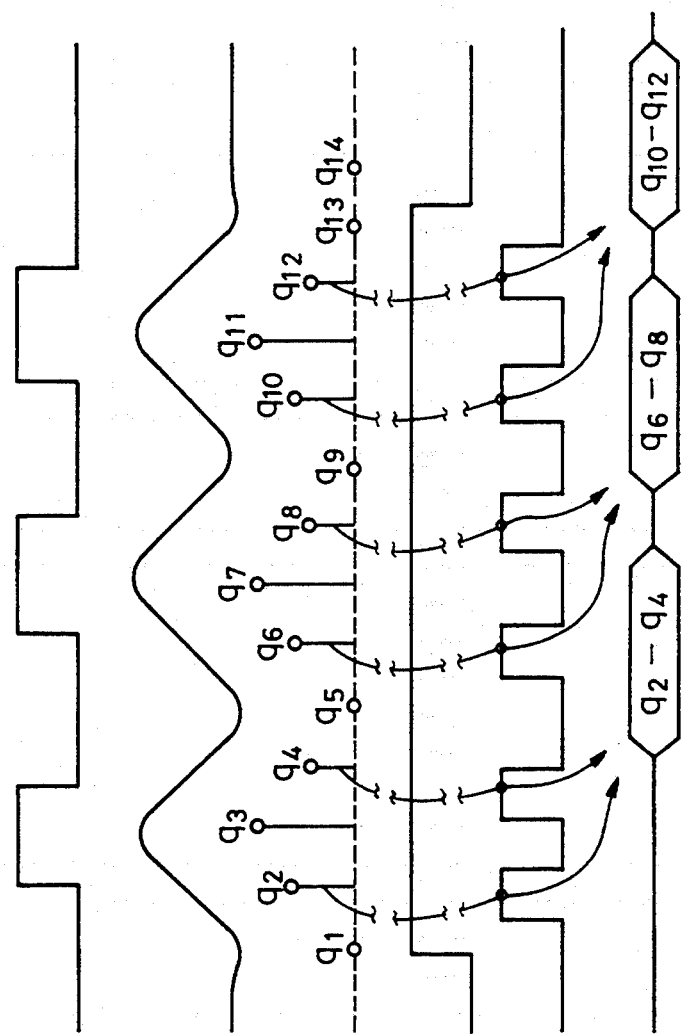
FIG. 9A to 9F are timing charts for explaining the operation of the digital signal reproducing apparatus of the present invention.

FIGS. 6 through 8 are diagrams for explaining this phase correcting operation by use of the calculated difference value (r).

First, FIG. 6 shows that a sampling clock (s) is generated at a correct phase relative to a read signal (p) as indicated by a broken line.

As illustrated, when the phase is correct, the timing of a peak sampled value q23 in sampled values {q22, q23, q24} produced in accordance with the clock pit Cp coincides with the timing of a peak value of the read signal (p), and the sampled values q22, q24 produced before and after this peak sampled value q23 present the same value. Thus, a calculated difference value (r) in this case is:

Calculated Difference Value (r)=Sampled value q22−Sampled value q24=0

Since the calculated difference value (r) is zero when the phase is correct, the VCO 16 generates the sampling clock (s) while maintaining the current phase.

Next, FIG. 7 shows that the sampling clock (s) is generated at a phase delayed from a read signal (p) as indicated by a broken line.

As illustrated, when the phase of the sampling clock (s) is delayed, the timing of a sampled value q23 does not coincide with the timing of a peak value of the read signal (p), whereby the relationship between sampled values q22 and q24 is expressed by q22>q24. Thus, a calculated difference value (r) in this case is:

Calculated Difference Value (r)=Sampled value q22−Sampled value q24=R>0

Since the calculated difference value (r) is larger than zero and presents a value "R" which corresponds to a phase shift amount in such a phase delayed situation, the VCO 16 generates the sampling clock (s) having a phase advanced by "R" from the current phase.

Next, FIG. 8 shows that the sampling clock (s) is generated at a phase advanced by "R" from a read signal (p) as indicated by a broken line.

As illustrated, when the phase of the sampling clock (s) is advanced, the timing of a sampled value q23 does not coincide with the timing of a peak value of the read signal (p), whereby the relationship between sampled values q22 and q24 is expressed by q22>q24. Thus, a calculated difference value (r) in this case is:

Calculated Difference Value (r)=Sampled value q22−Sampled value q24=R <0

Since the calculated difference value (r) is smaller than zero and presents a value "R" which corresponds to a phase shift amount in such a phase advanced situation, the VCO 16 generates the sampling clock (s) having a phase delayed by "R" from the current phase.

Incidentally, while the above embodiment has been explained for the case where a single clock pit Cp exists on each recording track of a disk, it should be understood that the present invention is not limited to this particular embodiment.

FIGS. 9A to 9F show an example of an operation for reproducing a disk on which a repetitive signal at a single frequency, called a preamble, is recorded as a phase reference signal for the clock.

In FIGS. 9A to 9F show the synchronization detecting circuit 11 detects a particularly formed synchronization pattern recorded before the preamble to produce a synchronization signal (k). The difference calculating circuit 12 calculates a difference value (r) in each cycle of the preamble and then calculates an average value of those difference values in order to correct the sampling clock (s) by use of this average value.

As described above, the digital signal reproducing apparatus according to the first invention of the present application makes good use of the fact that a difference between sampled values produced before and after a peak sampled value in a sequence of sampled values, produced in accordance with a read clock pit, indicates an amount of phase error by which a sampling clock is shifted from a read signal. Thus, the digital signal reproducing apparatus according to the first invention of the present application sequentially converts an analog read signal to digital sampled values at timings of the sampling clock signal, and a sequence of predetermined sampled values produced in accordance with a read clock pit are detected from the digital sampled values. Then, by calculating a difference value between sampled values produced at two timings which are spaced apart by a predetermined interval in the sequence of predetermined sampled values, the difference between sampled values produced before and after the peak sampled value is calculated and used to generate a sampling clock signal having the phase corrected on the basis of the difference value.

Next, a digital signal reproducing apparatus according to a second aspect of the present invention will be described.

Figure 10:
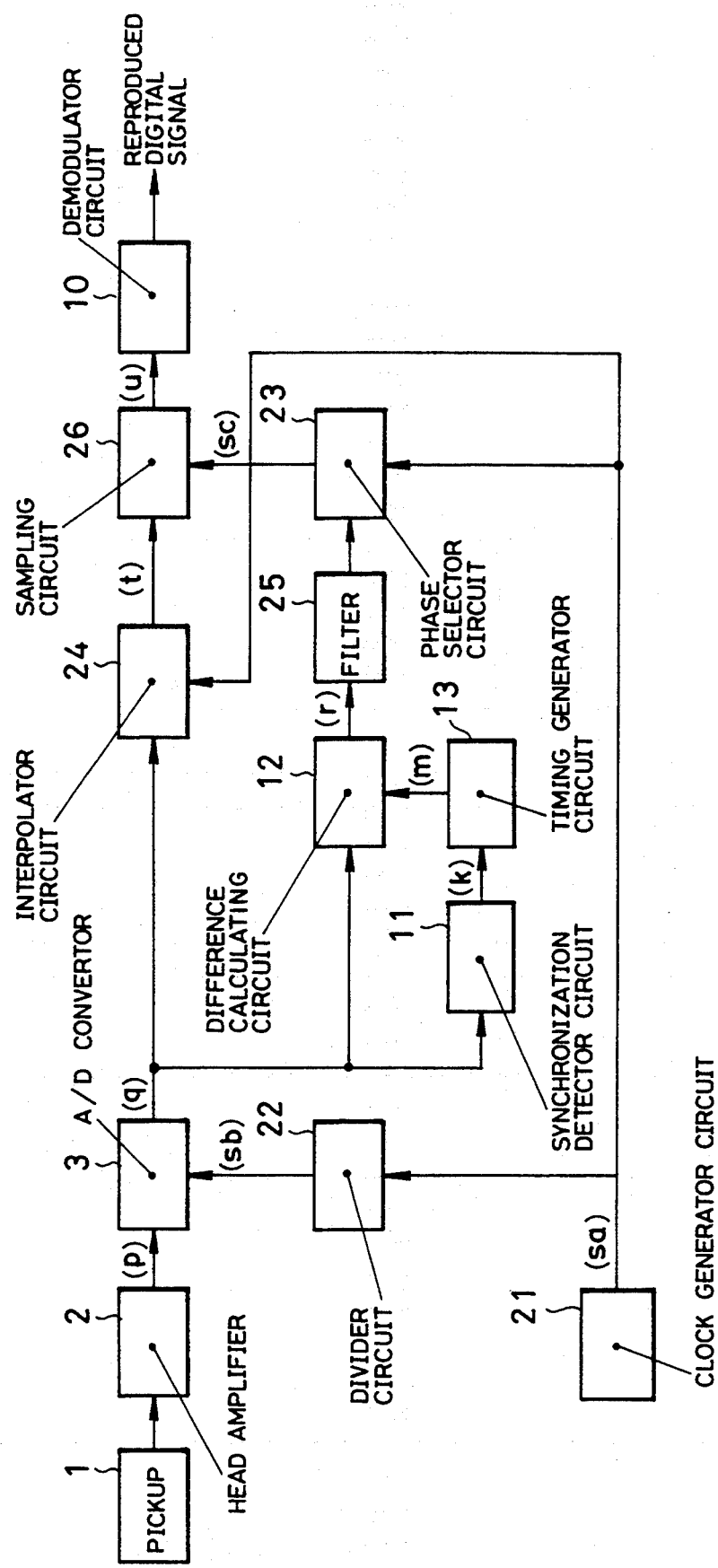
FIG. 10 is a block diagram showing the configuration of a digital signal reproducing apparatus according to another embodiment of the present invention.
Figure 13A:
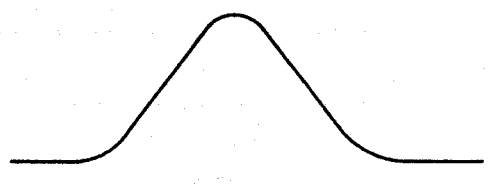
FIGS. 13A to 13E are timing charts for explaining the operation performed by the digital signal reproducing apparatus of the present invention.
Figure 13B:
Figure 13C:
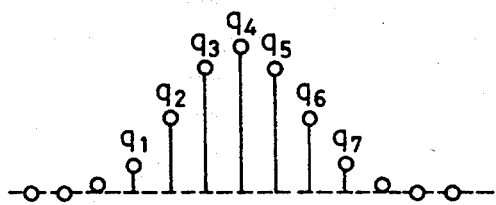
Figure 13D:
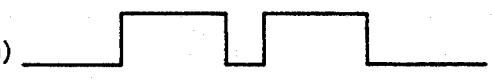
Figure 13E:
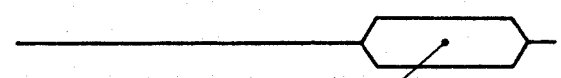

FIG. 10 shows the configuration of the digital signal reproducing apparatus.

In FIG. 10, a pickup 1 reads a signal recorded on a disk (not shown) and supplies a head amplifier 2 with a read signal corresponding to the recorded signal. The head amplifier 2 amplifies the supplied read signal and supplies the amplified read signal (p) to an A/D convertor 3. A clock generator circuit 21 generates a reference clock signal (sa) at a predetermined frequency which is supplied to a divider circuit 22, a phase selector circuit 23 and an interpolator circuit 24, respectively. The divider circuit 22 divides the supplied reference clock signal (sa) by, for example, four to produce a sampling clock (sb) which is supplied to the A/D convertor 3. The A/D convertor 3 converts the read signal (p) to sampled values (q) of a digital signal at timings of pulses of the sampling clock (sb), and supplies the digital sampled values (q) to the interpolator circuit 24 and a difference calculating circuit 12, respectively. The interpolator circuit 24 interpolates supplied sampled values (q) to produce interpolated sampled values (t) in synchronism with timings of pulses of the reference clock signal (sa). The interpolated sampled values (t) are supplied to a sampling circuit 26. A synchronization detector circuit 11 observes the sampled values (q) and generates a synchronizing signal (k) having a predetermined width when the sampled value maintains a predetermined level for a predetermined time, and supplies this synchronizing signal (k) to a timing generator circuit 13. The timing generator circuit 13 generates a timing signal (m) including two consecutive pulses having a predetermined pulse width and spaced by a predetermined interval in response to the synchronization signal (k), and supplies this timing signal to the difference calculating circuit 12. The difference calculating circuit 12 takes the difference between two sampled values (q) produced while the two pulses of the timing signal (m) are present, and supplies the difference to a filter 25 as a calculated difference value (r). The filter 25 calculates an average value of the supplied calculated difference value (r) which is supplied to the phase selector circuit 23. The phase selector circuit 23 first divides the reference clock signal (sa) in the same dividing ratio as that of the divider circuit 22 (i.e., by four) to generate a plurality of divided clock signals which have the phases shifted by one cycle of the reference clock signal (sa) from each other. The phase selector circuit 23 selects, from the plurality of divided clock signals, a divided clock signal which has the phase shifted corresponding to the calculated difference value (r) averaged by the filter 25, and supplies the selected clock signal to the sampling circuit 26 as a sampling clock (sc). The sampling circuit 26 fetches interpolated sampled values (t) at timings of pulses of the sampling clock (sc), and supplies the demodulator circuit 10 with the interpolated sampled values (t) as sampled values (u). The demodulator circuit 10 demodulates the sampled values (u), i.e., a digital signal which was modulated when recorded on a disk, and outputs the demodulated sampled values as a reproduced digital signal.

FIGS. 11A to 11J show an example of an operation timing chart associated with the digital signal reproducing apparatus as described above.

As shown in this timing chart, the A/D convertor 3 converts a read signal (p) to sampled values q1-q7 of a digital signal at timings of pulses of the sampling clock (sb). Among the sampled values q1-q7, q3-q5 are produced in accordance with a reproduced clock pit. Thus, the timing signal generator circuit 13 generates a timing signal (m) as illustrated in order to select the sampled values q3, q5 produced before and after the peak sampled value q4. The difference calculating circuit 12 subtracts the sampled value q5 from the sampled value q3, both selected by the timing signal (m), and outputs the subtraction result as a calculated difference value (r). The interpolator circuit 24 generates interpolated sampled values represented by solid black circles based on the respective sampled values q1-q7 represented by white circles in synchronism with the timings of pulses of the reference clock signal (sa), thus producing interpolated sampled values (t). The phase selector circuit 23 generates sampling clocks (sc1), (sc2), (sc3), (sc4) at the same frequency, which have the phases shifted by one cycle of the reference clock signal (sa) from each other, as shown in FIGS. 12C to 12F. The phase selector circuit 23 selects the sampling clock (sc4), from the above-mentioned four sampling clocks, which corresponds to the calculated difference value (r) averaged by the filter 25, and outputs the selected (sc4) as the sampling clock (sc).

It is understood in FIGS. 11A to 11J that the phase of the sampling clock (sb) is delayed by one cycle of the reference clock signal (sa) from the read signal (p). Therefore, the calculated difference value (r) by subtracting the sampled value q5 from the sampled value q3 presents a value corresponding to a delay equal to one cycle of the reference clock signal (sa). The phase selector circuit 23 selects the sampling clock (sc4) corresponding to the calculated difference value (r) from the sampling clocks (sc1), (sc2), (sc3), (sc4), and supplies the sampling circuit 26 with the selected sampling clock (sc4) as the sampling clock (sc). Here, the sampling clock (sc4) is in advance of the sampling clock (sb) by one cycle of the reference clock signal (sa), as shown in FIGS. 12A to 12F. Thus, by sampling the interpolated sampled values (t) with the selected sampling clock (sc4), the sampled values (u) can be produced at phase corrected timings, as described above.

Incidentally, if the phase of the sampling clock (sb) is correct relative to the read signal (p), the phase selector circuit 23 selects the sampling clock (sc1) having the same phase as the sampling clock (sb) from the sampling clocks (sc1), (sc2), (sc3), (sc4), and supplies the sampling circuit 26 with the selected sampling clock (sc1) as the sampling clock (sc).

As described above, the digital signal reproducing apparatus according to the second aspect of the present invention makes good use of the fact that a difference between sampled values before and after a peak sampled value in a sequence of sampled values, produced in accordance with a read clock pit, indicates an amount of phase error by which a sampling clock is shifted from a read signal. Specifically, the digital signal reproducing apparatus of the second invention generates a second sampling clock signal having the phase corrected on the basis of the difference, performs interpolation calculations on the sampled values to produce interpolated sampled values, and again samples the interpolated sampled values by using the second sampling clock signal.

It should be understood that while in the embodiments of the present invention shown in FIGS. 4 and 10, the difference calculating circuit 12 and the timing generator circuit 13 provide the calculated difference value (r) by subtracting the sampled value produced after the peak sampled value from the sampled value produced before the peak sampled value, the difference value (r) is calculated from each one sampled value produced before and after the peak sampled value. However, the number of samples used for this calculation is not limited to the above value.

For example, as shown in FIGS. 13A to 13E the timing generator circuit 13 may generate a timing signal (m) as illustrated in order to select sampled values q1–q3 before a peak sampled value q4 and sampled values q5–q7 after the peak sampled value q4. The difference calculating circuit 12 may subtract the sum of the sampled values q5–q7, selected during the second pulse duration of the timing signal (m), from the sum of the sampled values q1–q3 selected during the first pulse duration of the timing signal (m), and output the subtraction result as the calculated difference value (r).

When the sums of plural sampled values are used as described above, the influence of noise included in the read signal can be reduced, thus providing more accurate phase error detection.

As will be understood from the foregoing, the digital signal reproducing apparatus according to the present invention detects a sequence of predetermined sampled values from sampled values produced by A/D converting a read signal, calculates a difference value between two samples produced at timings which are spaced apart by a predetermined interval from each other, and generates a sampling clock having the phase corrected on the basis of this difference.

Thus, according to the present invention, since the phase of the sampling clock is corrected on the basis of sampled values produced by the A/D conversion, this phase correction can be made without influence of fluctuations in circuit delays caused by changes in temperature, power supply voltage and so on, thus providing accurate digital signal reproduction. Also, since the phase of the sampling clock is corrected on the basis of a difference between two sampled values produced by A/D converting a read signal, the phase correction of the sampling clock is achieved, even if DC offset components are superimposed on a read signal to cause changes in the level of the whole read signal, without being influenced by such changes.

What is claimed is:

1. A digital signal reproducing apparatus which samples a read signal taken from a recording medium having digital signals recorded thereon to produce sampled values of a digital signal, comprising:

A/D convertor means for sampling said read signal at timings of pulses of a sampling clock signal to sequentially produce sampled values;

detector means for detecting a sequence of predetermined sampled values in said sampled values;

difference calculating means for calculating a difference between two sampled values, selected from said sequence of predetermined sampled values, to derive a difference value, said two sampled values being produced at timings spaced apart by a predetermined interval; and clock generator means for generating said sampling clock which has its phase corrected on the basis of said difference value.

2. A digital signal reproducing apparatus which samples a read signal taken from a recording medium having digital signals recorded thereon to produce sampled values of a digital signal, comprising:

A/D convertor means for sampling said read signal at timings of pulses of a first sampling clock signal to sequentially produce sampled values;

detector means for detecting a sequence of predetermined sampled values in said sampled values;

difference calculating means for calculating a difference between two sampled values selected from said sequence of predetermined sampled values to derive a difference value, said two sampled values being produced at timings spaced apart by a predetermined interval;

interpolator means for performing interpolation operations on said sampled values to produce interpolated sampled values;

clock generator means for generating a second sampling clock signal, the phase of which is corrected on the basis of said difference value, said second sampling clock signal having the same frequency as said first sampling clock signal; and sampling means for fetching said interpolated sampled values at timings of pulses of said second sampling clock signal and outputting said interpolated sampled values.

* * * * *